(12) United States Patent
Suzuki

(10) Patent No.: US 7,042,503 B2
(45) Date of Patent: May 9, 2006

(54) IMAGE SENSING APPARATUS, METHOD AND PROGRAM FOR DISTANCE MEASUREMENT

(75) Inventor: Satoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 09/938,250

(22) Filed: Aug. 23, 2001

(65) Prior Publication Data

US 2002/0067423 A1    Jun. 6, 2002

(30) Foreign Application Priority Data

Aug. 24, 2000   (JP) .............................. 2000-253969

(51) Int. Cl.
| H04N 5/235 | (2006.01) |
| H04N 9/64 | (2006.01) |
| G03B 3/00 | (2006.01) |
| G03B 3/10 | (2006.01) |
| H03F 3/04 | (2006.01) |

(52) U.S. Cl. ..................... 348/229.1; 348/243; 396/97; 396/99; 330/289

(58) Field of Classification Search ................ 396/97, 396/99, 106, 104, 109, 121; 330/254, 256, 330/289; 356/3.01, 3.08, 4.01; 348/229.1, 348/241, 243, 348, 349, 350
See application file for complete search history.

(56) References Cited

U.S. PATENT DOCUMENTS

| 4,755,759 | A | * | 7/1988 | Arai et al. ................... 348/373 |
| 4,760,453 | A | * | 7/1988 | Hieda .......................... 348/243 |
| 5,568,187 | A | * | 10/1996 | Okino ....................... 348/224.1 |
| 5,754,422 | A | * | 5/1998 | Lowles et al. .................. 700/1 |
| 5,870,178 | A | * | 2/1999 | Egawa et al. ............... 356/3.03 |
| 5,963,308 | A | * | 10/1999 | Takasaki et al. ........... 356/3.01 |
| 6,026,246 | A | * | 2/2000 | Yoshida et al. ............. 396/106 |
| 6,114,910 | A | * | 9/2000 | Goff ........................... 330/289 |
| 6,160,613 | A | * | 12/2000 | Takasaki et al. ........... 356/3.08 |
| 6,173,122 | B1 | * | 1/2001 | Matsumoto et al. ........ 396/104 |

FOREIGN PATENT DOCUMENTS

| EP | 1049250 A2 | * | 11/2000 |
| JP | 06006595 A | * | 1/1994 |

* cited by examiner

Primary Examiner—Tuan Ho
Assistant Examiner—Justin Misleh
(74) Attorney, Agent, or Firm—Morgan & Finnegan, LLP

(57) ABSTRACT

An image sensing apparatus of this invention includes a signal generator adapted to generate a signal upon reception of input light, a transfer unit adapted to transfer the signal generated by the signal generator, a temperature measuring unit adapted to measure a temperature, an amplification unit adapted to amplify the signal transferred from the transfer unit, and a control unit adapted to control the gain of the amplification unit at a first temperature to be lower that the gain of the amplification unit at a second temperature measuring unit, the second temperature being lower than the first temperature.

7 Claims, 11 Drawing Sheets

IMAGE SENSING APPARATUS, METHOD AND PROGRAM FOR DISTANCE MEASUREMENT

FIELD OF THE INVENTION

The present invention relates to an image sensing apparatus having a mechanism adapted to transfer an electrical signal obtained by photoelectrically converting a light reception signal, a distance measuring apparatus, an image sensing method, and a distance measuring method.

BACKGROUND OF THE INVENTION

A passive distance measuring apparatus has been known as a conventional distance measuring apparatus for accumulating signal charges from a light-receiving means such as a sensor array and measuring distance in accordance with an output signal representing the signal charges. Some distance measuring apparatus of this type has a charge transfer means such as a CCD as a means for reading the signal charges from the light-receiving means.

An active distance measuring apparatus which projects spot light to an object the distance to which is to be measured and receives light reflected by the object to perform distance measurement by triangulation is also known. Some distance measuring apparatus of this type additionally uses a sensor array such as a CCD as a light-receiving means.

Most of the distance measuring apparatuses having the charge transfer means such as the CCD described above have a function of multiplying an output signal by a gain so as to accurately measure distance regardless of the magnitude of a light reception signal amount. As an implementation example, some apparatus has a gain amplifier in the output stage of a CCD sensor, and some apparatus has an arrangement in which a digital signal obtained by A/D conversion in a CPU for arithmetically operating a signal from a CCD sensor is multiplied by a gain. In a distance measuring apparatus having such an arrangement, the gain of an output is made high to implement high-reliability distance measurement operation when the light reception signal amount is small, while the gain is made low to prevent signal saturation when the light reception signal amount is large.

In an image sensing apparatus including an image forming function in addition to the above-mentioned distance measuring apparatuses, a large amount of dark current is generated along with an increase in temperature. When a high gain is used for a signal from a light-receiving unit, the signal saturates to result in signal processing errors in subsequent operations. In particular, in the distance measuring apparatus having the charge transfer means as described above, a dark current except a light reception signal charge is generated. This dark current abruptly increases with an increase in temperature, as shown in FIG. 11. The dark current almost doubles with an increase in temperature of 10° C. In addition, when the output signal is multiplied by the gain, as described with reference to the above prior art, the dark current is also multiplied by the gain. The dark current has no influence at room temperature, but the output signal may saturate with a high gain at a high temperature. The magnitude of the gain is determined by a dark current generated at the highest temperature guaranteed by the distance measuring apparatus.

SUMMARY OF THE INVENTION

The present invention has been made in consideration of the above conventional problems. According to the first aspect of an image sensing apparatus, the image sensing apparatus is characterized by the following arrangement.

That is, an image sensing apparatus comprises a signal generator adapted to generate a signal upon reception of input light, a transfer unit adapted to transfer the signal generated by the signal generator, a temperature measuring unit adapted to measure a temperature, an amplification unit adapted to amplify the signal transferred from the transfer unit, and a control unit adapted to control a gain of the amplification unit at a first temperature to be lower than a gain of the amplification unit at a second temperature in accordance with a measurement by the temperature measuring unit, the second temperature being lower than the first temperature.

According to the second aspect of an image sensing apparatus of the present invention, the image sensing apparatus is characterized by the following arrangement.

That is, an image sensing apparatus comprises a signal generator adapted to generate a signal upon reception of input light, a transfer unit adapted to transfer the signal generated by the signal generator, a temperature measuring unit adapted to measure a temperature, an amplification unit adapted to amplify the signal transferred from the transfer unit, and a control unit adapted to control to decrease a gain when a temperature measured by the temperature measuring unit is higher than a predetermined temperature and increase the gain when the temperature measured by the temperature measuring unit is lower than the predetermined temperature.

According to the third aspect of an image sensing apparatus of the present invention, the image sensing apparatus is characterized by the following arrangement.

That is, an image sensing apparatus comprises a signal generator adapted to generate a signal upon reception of input light, a transfer unit adapted to transfer the signal generated by the signal generator, a temperature measuring unit adapted to measure a temperature, an amplification unit adapted to amplify the signal transferred from the transfer unit, and a control unit adapted to control to suppress a gain of the amplification unit to not less than a predetermined value when a temperature measured by the temperature measuring unit is not less than a predetermined temperature.

A distance measuring apparatus according to the present invention is characterized by the following arrangement.

That is, a distance measuring apparatus comprises a signal generator adapted to generate a signal upon reception of light reflected by an object, a transfer unit adapted to transfer the signal generated by the signal generator, a temperature measuring unit adapted to measure a temperature, an amplification unit adapted to amplify the signal transferred from the transfer unit, a control unit adapted to change a gain of the amplification unit in accordance with a measurement in the temperature measuring unit, and a distance calculating unit adapted to calculate a distance on the basis of a signal amplified by the amplification unit.

According to the first aspect of an image sensing method of the present invention, the image sensing method is characterized by the following procedures.

That is, there is provided an image sensing method comprising generating a signal upon reception of input light, transferring the generated signal, measuring a temperature, amplifying the transferred signal, and controlling a gain at a first temperature to be lower than a gain at a second temperature lower than the first temperature.

According to the second aspect of an image sensing method of the present invention, the image sensing method is characterized by the following procedures.

That is, there is provided an image sensing method comprising generating a signal upon reception of input light, transferring the generated signal, measuring a temperature, amplifying the transferred signal, and controlling a gain to decrease when the measured temperature is higher than a predetermined temperature and to increase when the measured temperature is lower than the predetermined temperature.

According to the third aspect of an image sensing method of the present invention, the image sensing method is characterized by the following procedures.

That is, there is provided an image sensing method comprising generating a signal upon reception of input light, transferring the generated signal, measuring a temperature, amplifying the transferred signal, and controlling a gain to not more than a predetermined value when the measured temperature is not less than a predetermined temperature.

A distance measuring method according to the present invention has the following procedures.

That is, there is provided a distance measuring method comprising generating a signal upon reception of light reflected by an object, transferring the generated signal, measuring a temperature, amplifying the transferred signal at a gain corresponding to the measured temperature, controlling the gain to change in accordance with the measurement, and calculating a distance on the basis of the amplified signal.

A program according to the present invention is characterized by causing a computer to execute the above image sensing method.

A recording medium according to the present invention is characterized by storing the above program.

A program according to the present invention is characterized by causing a computer to execute the above distance measuring method.

A recording medium according to the present invention is characterized by storing the above program.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail below.

Distance measuring apparatuses according to the embodiments will be described. A distance measuring apparatus in each embodiment has a skim function for eliminating DC signal components equivalent in a pair of ON and OFF light projection operations from a CCD. According to this skim function, a signal charge amount in the light projection OFF period is monitored. When this signal charge amount reaches a predetermined charge amount, skim operation is started. The distance measuring apparatus calculates distance on the basis of a signal representing only the reflected light component of spot light from a light projection means except an external light component, i.e., on the basis of a difference signal between a signal charge amount in the light projection ON period and a signal charge amount in the light projection OFF period. A distance measuring apparatus of the embodiment can be used not only as an active distance measuring apparatus but also as a passive distance measuring apparatus. The distance measuring apparatus can be used as a hybrid distance measuring apparatus which complements for distance measuring conditions unsuitable for only active or passive AF.

Figure 2:
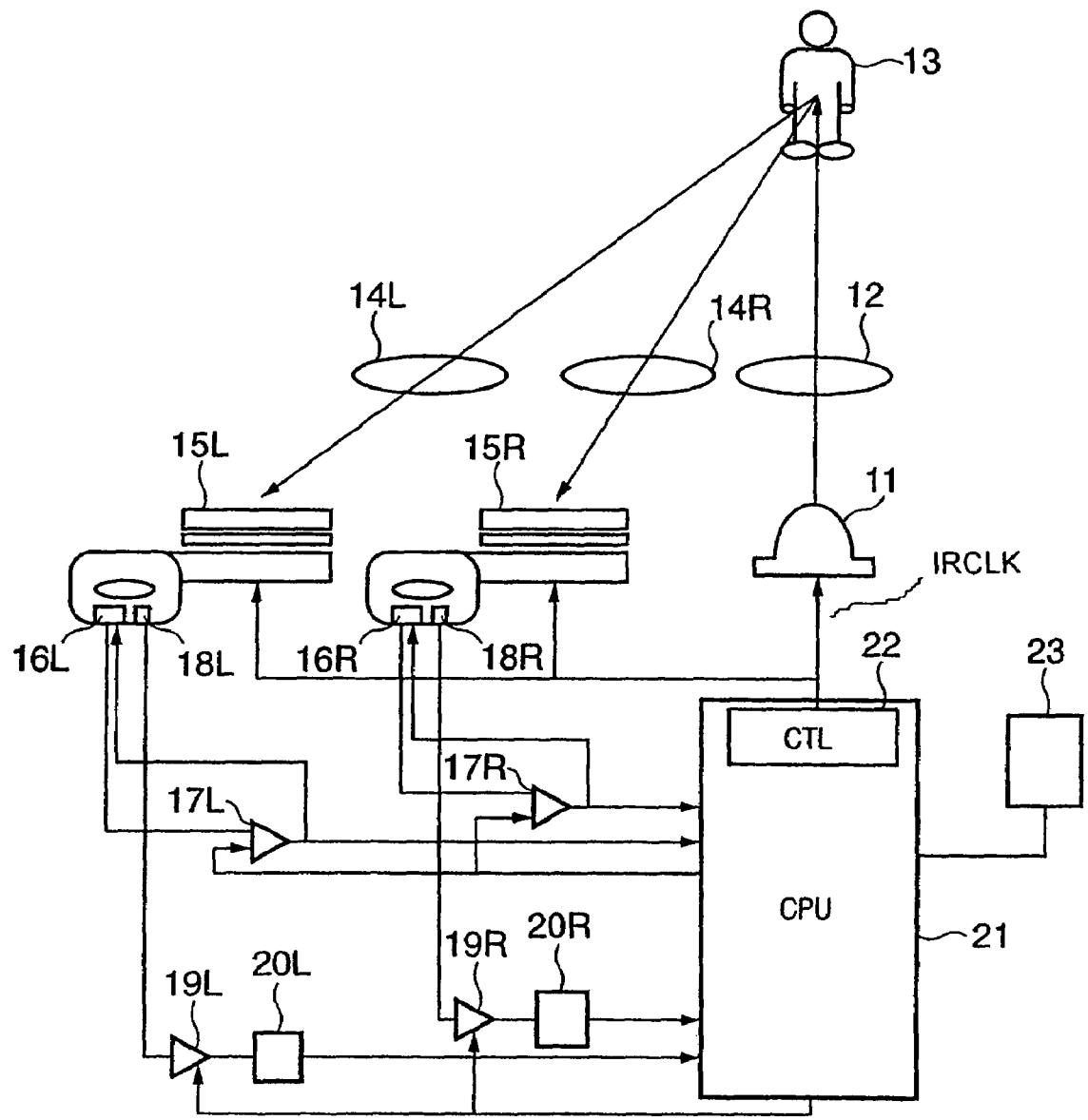
FIG. 2 is a block diagram showing an arrangement when the distance measuring apparatus of the embodiments of the present invention is used as an active distance measuring apparatus.
Figure 3:
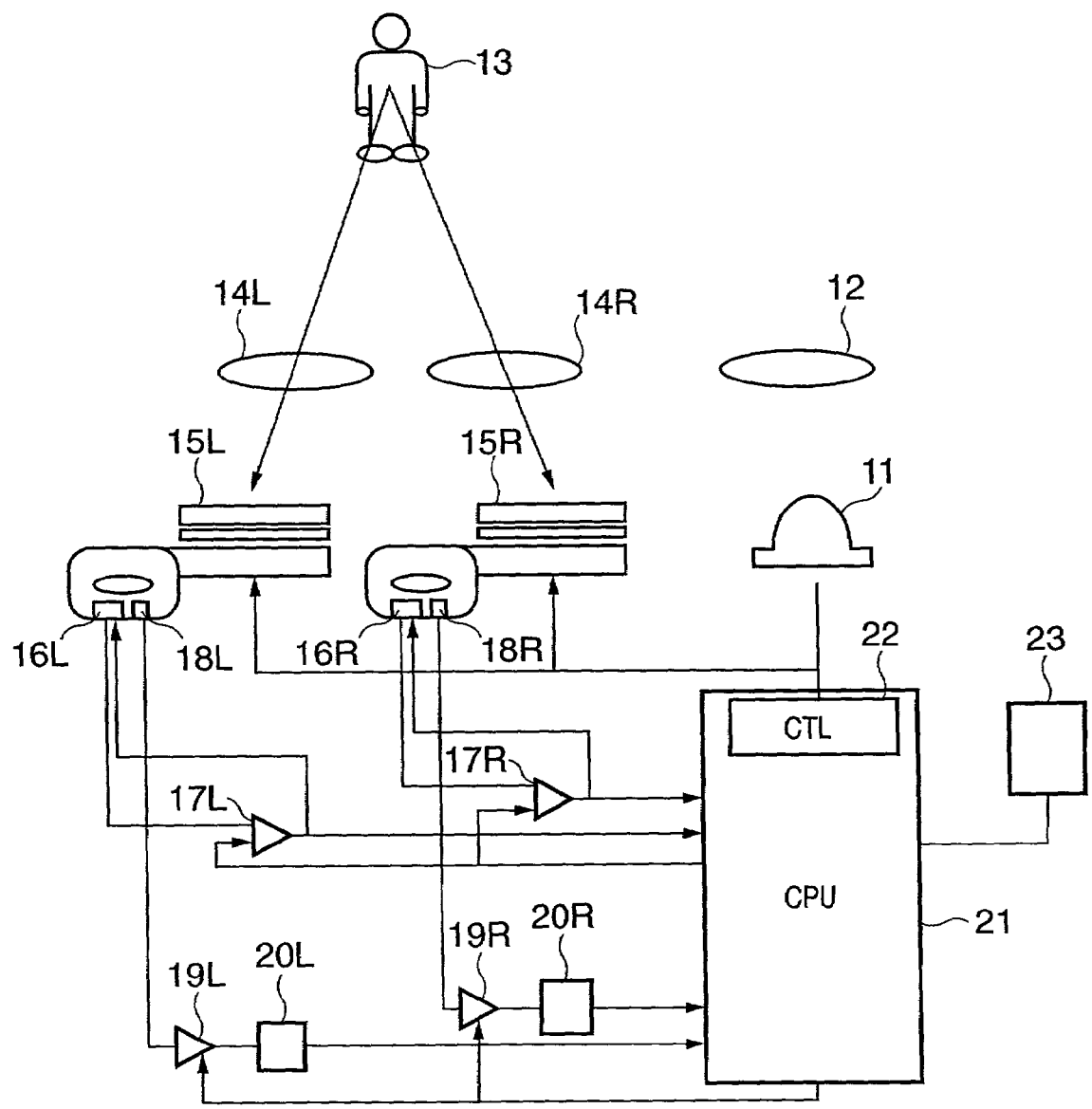
FIG. 3 is a block diagram showing an arrangement when the distance measuring apparatus of the embodiments of the present invention is used as a passive distance measuring apparatus.

The basic arrangements of distance measuring apparatuses according to the embodiments will be described with reference to FIGS. 2 and 3.

[Active Distance Measurement]

A distance measuring apparatus used as an active distance measuring apparatus will be described with reference to FIG. 2. Referring to FIG. 2, a control circuit 22 outputs an IRED control clock signal IRCLK to turn on an IRED (Infrared LED) 11. Projection light from the IRED 11 is reflected by an object 13 through a projection lens 12 and forms light reception images on light-receiving units 15R and 15L formed on different semiconductor substrates through light-receiving lenses 14R and 14L. In this embodiment, the light-receiving units 15R and 15L are formed on different semiconductor substrates, but may be formed on a single substrate. Upon turning on the IRED 11, light reception images appear on the light-receiving units 15R and 15L. These signal light beams and external light are converted into charges by a photoelectric conversion element. That is, the light-receiving units 15R and 15L are comprised of photoelectric conversion elements such as a plurality of photodiodes. These photoelectric conversion elements generate electrical signals derived from optical signals. When the IRED 11 is OFF, only external light is incident on the light-receiving units 15R and 15L and converted into electric charges.

The charges bypass CCD ring portions of the light-receiving units 15R and 15L and are accumulated. Skim operation units 16R and 16L in the rings and external light amount comparators 17R and 17L monitor, of all the transferred charges, only signals in the IRED OFF state. When the transferred charge is equal to or larger than a predetermined charge amount or an amount set in the CPU 21, the same charge amount is removed from the signal charge in the IRED ON state and the signal charge in the IRED OFF state paired with the IRED ON state. The transferred charges are transferred from output amplifier floating gates 18R and 18L to difference calculation units 20R and 20L via output amplifiers 19R and 19L. The difference calculation units 20R and 20L convert the input signals into a difference signal between the pair of signals in the IRED ON and OFF states. The gains of the output amplifiers 19R and 19L can be changed and set, and can be selected in accordance with a control signal from the CPU 21. In this embodiment, the gain can be selected from gains of x1 and x4. The gain of x4 here means a high gain which was not used in the conventional case due to a large dark current at high temperatures. High gain can be selected at temperatures when the dark current does not exceed an allowable value (to be described later). In this embodiment, the gains are selected from the gains of x1 and x4. However, the gains need not be limited to these. The gains may be selected from gains of x1, x3, and x5. This also applies to passive distance measurement (to be described later).

The CPU 21 monitors the output signals from the difference calculation units 20R and 20L. When a signal amount is small, the gain of x4 is selected. When the signal amount is large, the gain is switched to the gain of x1. The gains need not be limited to the gains of x1 and x4. It suffices gains can be selected. This also applies to passive distance measurement (to be described later).

Figure 1:
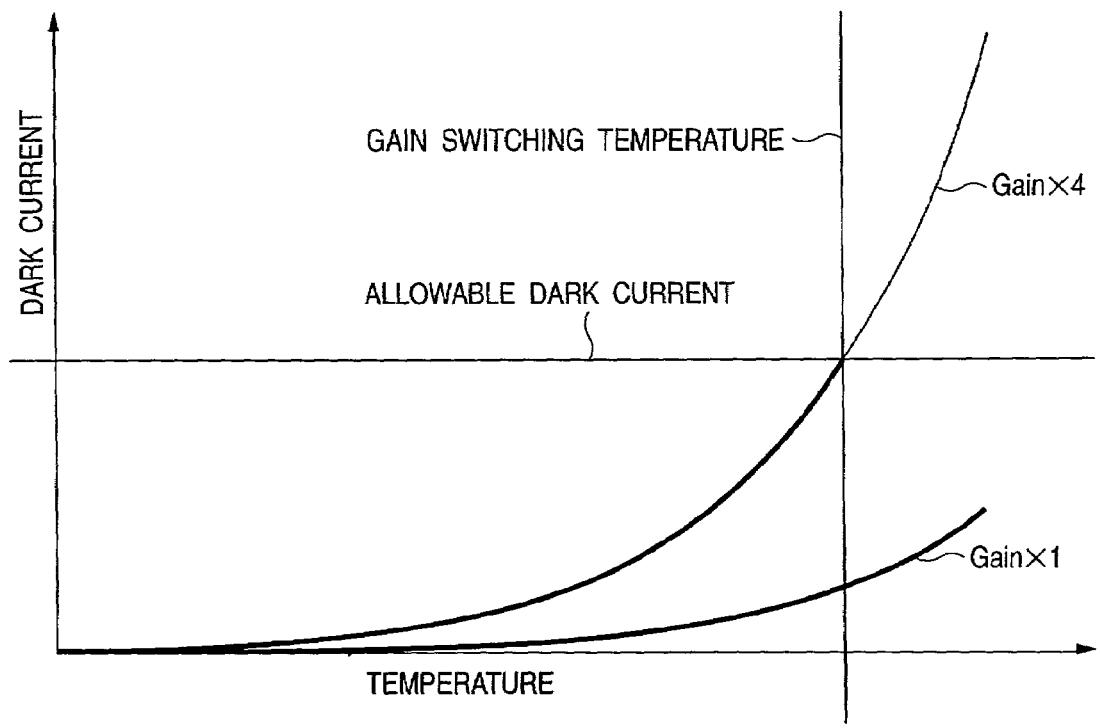
FIG. 1 is a graph showing a gain switching temperature and the relationship between the temperature and dark current in a distance measuring apparatus according to embodiments of the present invention.

At this time, as shown in FIG. 1, when an output from a temperature determination unit 23 represents a temperature higher than a predetermined gain switching temperature and even if the signal amount is small, the gain of x1 is set. The gain switching temperature is set such that the total dark current amount does not exceed a predetermined value (allowable dark current amount) determined by the system. It suffices that the gain is determined in consideration of the allowable dark current. The gain may be determined linearly or nonlinearly in correspondence with the output from the temperature determination unit 23. This also applies to passive distance measurement (to be described later).

Upon subsequent charge accumulation, when the CPU 21 determines that the charges have reached a predetermined level sufficient for distance measurement calculation, the CPU 21 outputs a control signal for ending signal accumulation to the IRED 11 and the light-receiving units 15R and 15L. The CPU 21 obtains the charges corresponding to the light beams reflected by the object 13 and incident on the sensors of the light-receiving units 15R and 15L upon light projection from the IRED 11. The CPU 21 performs correlation calculation (phase difference detection) from the obtained image data, thereby obtaining the relative positional relationship between the two light reception images. The distance to the object 13 is then calculated using the principle of triangulation using the obtained relative positional relationship.

Figure 5A:
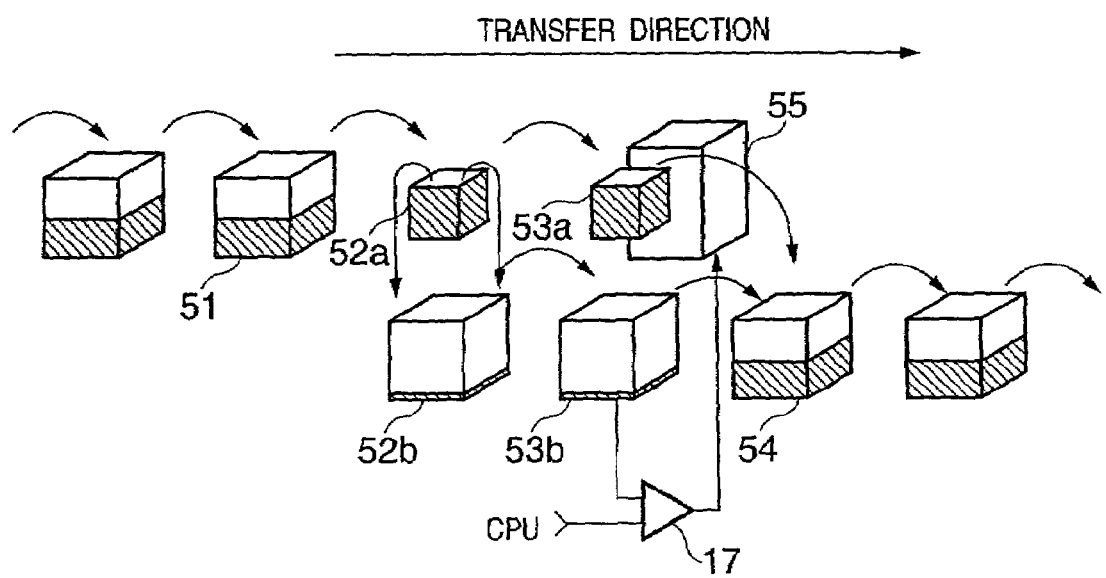
FIGS. 5A and 5B are views showing a model for explaining "skim operation" in the distance measuring apparatus according to the embodiments of the present invention.

The skim operation of the skim operation units 16R and 16L will be described with reference to FIGS. 5A and 5B. FIG. 5A is a view showing a model for explaining skim operation when the external light amount is small. When the charge transferred from a transfer stage 51 to a metering transfer stage 52a is larger than the predetermined capacity of the transfer stage 52a, the overflow charge is shifted to a transfer stage 52b. The charges in the transfer stages 52a and 52b are then transferred to transfer stages 53a and 53b. When an external light amount determination comparator 17 determines that the charge in the transfer stage 53b is equal to or smaller than a predetermined amount, the charges in the transfer stages 53a and 53b are directly transferred to a transfer stage 54 and then to a subsequent transfer stage.

Figure 5B:
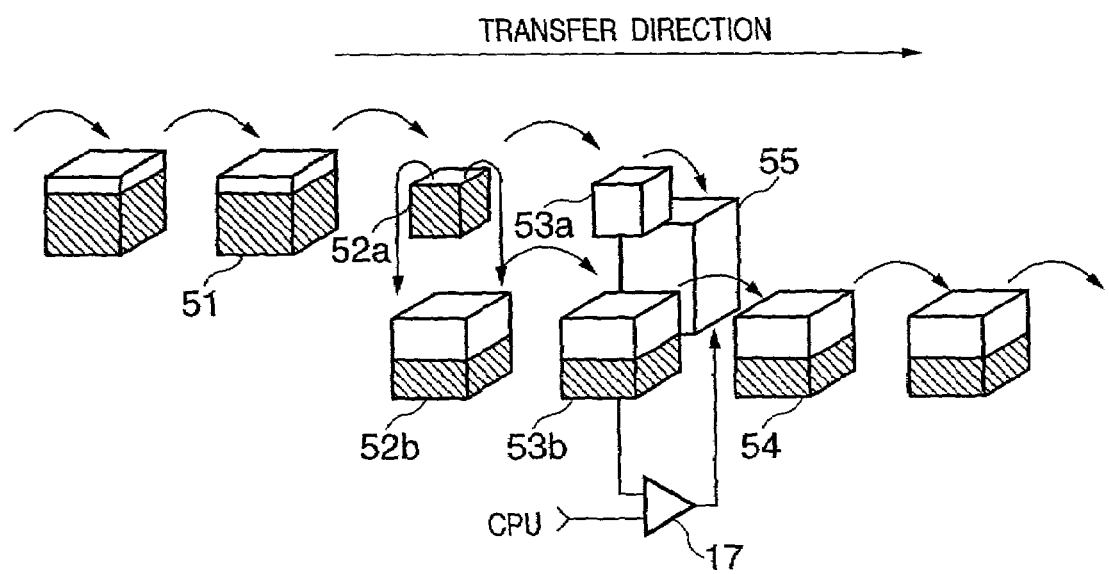

FIG. 5B is a view showing a model for explaining skim operation when the external light amount is large. As in FIG. 5A where the external light amount is small, the charges are transferred to the transfer stages 53a and 53b, respectively. When the external light amount determination comparator 17 determines that the charge in the transfer stage 53b is larger than the predetermined amount, the charge in the transfer stage 53a is drained via a clear gate 55. Only the charge in the transfer stage 53b is transferred to the transfer stage 54 and then to a subsequent transfer stage. That is, when the charge transferred to the transfer stage 51 is larger than the sum of the capacity of the transfer stage 52a and the determination level of the external light amount determination comparator 17, the charge corresponding to the capacity of the transfer stage 52a is drained.

[Passive Distance Measurement]

The distance measuring apparatus as a passive distance measuring apparatus will be described with reference to FIG. 3. Referring to FIG. 3, light beams such as reflected light beams of natural light from the object 13 form light reception images on the light-receiving units 15R and 15L through the light-receiving lenses 14R and 14L. The photoelectric converters convert the light reception images into electric charges. The charges bypass the ring portions of the CCDs of the light-receiving units 15R and 15L and are accumulated. In passive distance measurement, even if the external light amount determination comparators 17R and 17L are inverted, no skim operation is done. The transferred charges are transmitted from the output amplifier floating gates 18R and 18L to the difference calculation units 20R and 20L via the output amplifiers 19R and 19L. In passive distance measurement, no difference calculation in accordance with a control signal from the CPU 21 is performed. The input signals are directly output. The gains of the output amplifiers 19R and 19L are switched between x1 and x4 in accordance with the light reception signal amounts as in active distance measurement. As in active distance measurement, when the output from the temperature determination unit 23 is equal to or higher than the gain switching temperature, switching to x4 is inhibited. When the CPU 21 determines that the output signals from the difference calculation units 20R and 20L have reached a predetermined level sufficient for distance measurement calculation, the outputs are inverted. When the outputs from the external light amount determination comparators 17R and 17L are inverted, the CPU 21 outputs a control signal for ending signal accumulation to the light-receiving units 15R and 15L via the control circuit 22. In accordance with the outputs from the difference calculation units 20R and 20L, the CPU 21 obtains the charges corresponding to light reflected by the object 13 and incident on the sensors of the light-receiving units 15R and 15L. The CPU 21 performs correlation calculation from the resultant image data to obtain the relative positional relationship between the two light reception images. The CPU 21 can calculate the distance to the object 13 using the principle of triangulation using the relative positional relationship. Note that the IRED 11 and skim operation units 16R and 16L are not used when the distance measuring apparatus of this embodiment is used as a passive distance measuring apparatus.

The arrangement near the charge transfer unit of the distance measuring apparatus of this embodiment will be described in detail with reference to FIG. 4. The portion near the charge transfer unit of the distance measuring apparatus of this embodiment corresponds to the light-receiving units 15R and 15L in FIGS. 2 and 3.

Figure 4:
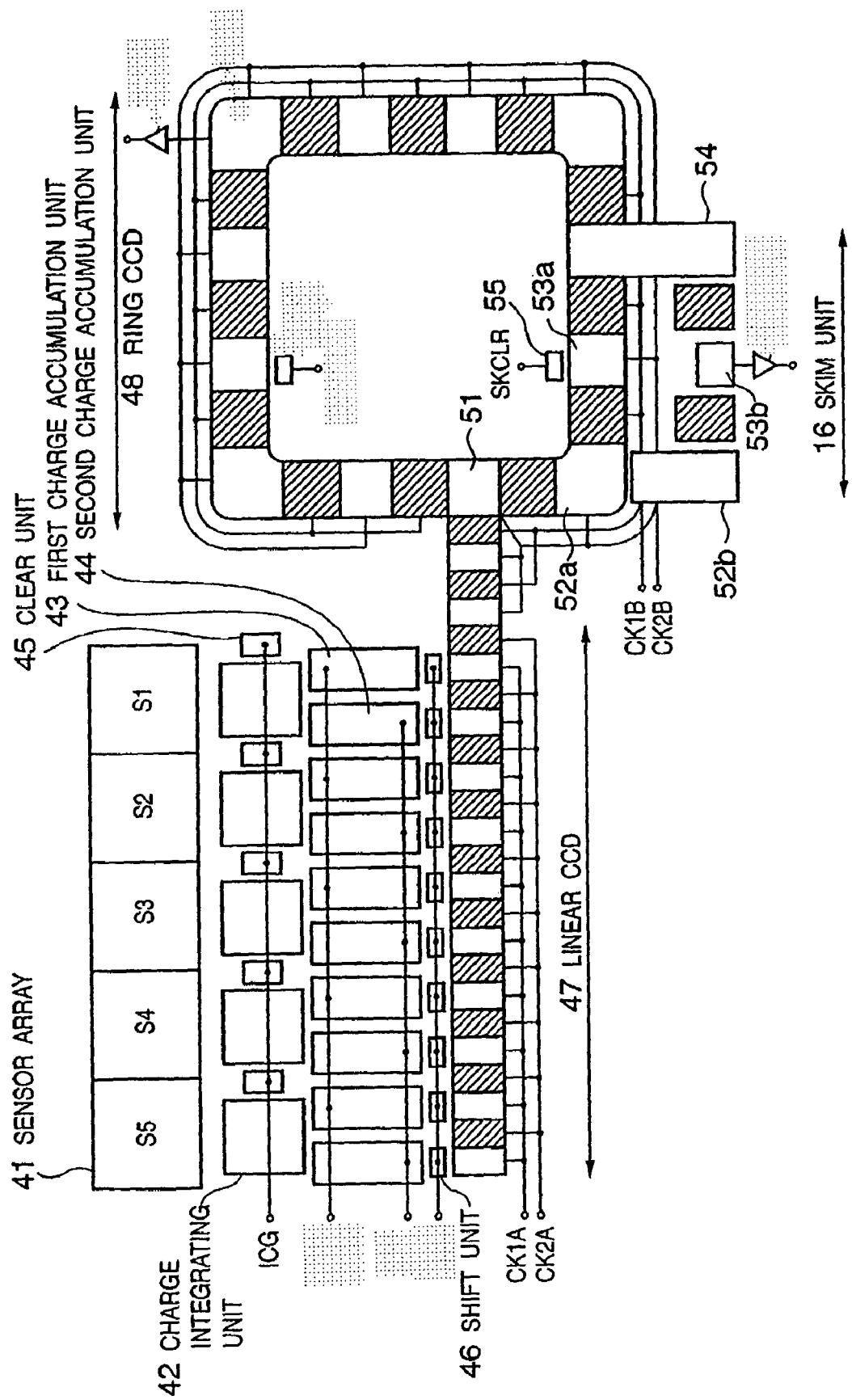
FIG. 4 is a view showing an arrangement near a charge transfer unit in the distance measuring apparatus of the embodiments of the present invention.

FIG. 4 is a view showing an arrangement near the charge transfer unit of the distance measuring apparatus of this embodiment. This distance measuring apparatus has a sensor array 41 comprised of five sensor pixels S1 to S5. The signal charges photoelectrically converted by the sensor pixels are integrated in a charge integrating unit 42. The charge integrating unit 42 is arranged parallel to the sensor array 41 and serves to temporarily accumulate and hold the charges. When this distance measuring apparatus is used as an active distance measuring apparatus, the charges accumulated in the charge integrating unit 42 are transferred such that the signal charges in the light projection means (e.g., an IRED) ON state are transferred to a second charge accumulation unit 44, while the signal charges in the IRED OFF state are transferred to a first charge accumulation unit 43. When this distance measuring apparatus is used as a passive distance measuring apparatus, the charges accumulated in the charge integrating unit 42 are alternately transferred to the first and second charge accumulation units 43 and 44 upon the lapse of a predetermined accumulation time. During the accumulation inhibition period, the charges accumulated in the charge integrating unit 42 are transferred to and cleared in a clear unit 45 in accordance with a signal ICG.

A shift unit 46 driven by a signal SH transfers the charges accumulated in the first and second charge accumulation units 43 and 44 to a linear CCD 47 serving as the first charge transfer unit of the charge transfer means. The linear CCD 47 is coupled to a ring CCD 48 serving as the second charge transfer unit. Each of the linear CCD 47 and ring CCD 48 is comprised of a 2-phase CCD driven by a two-phase clock. Each CCD stage may be comprised of a 3- or 4-phase CCD. The linear CCD 47 transfers charges in response to clock signals CK1A and CK2A, while the ring CCD 48 transfers charges in response to transfer clock signals CK1B and CK2B. The number of stages of each charge transfer unit is as follows. The linear CCD 47 has a total of 24 stages, i.e., 20 stages which is twice the total number of charge accumulation units 43 and 44 and four stages as the connecting portion with the ring CCD 48. The ring CCD 47 also has 24 stages. In accordance with this relationship between the numbers of transfer stages, each transfer stage in the ring CCD 48 always receives the signal charges from the same sensor pixel and adds the signal charges. The skim unit 16 has been described with reference to FIG. 5, and a detailed description thereof will be omitted.

The distance measuring operations of the distance measuring apparatuses of the embodiments of the present invention will be described with reference to FIGS. 6 to 10.

Figure 6:
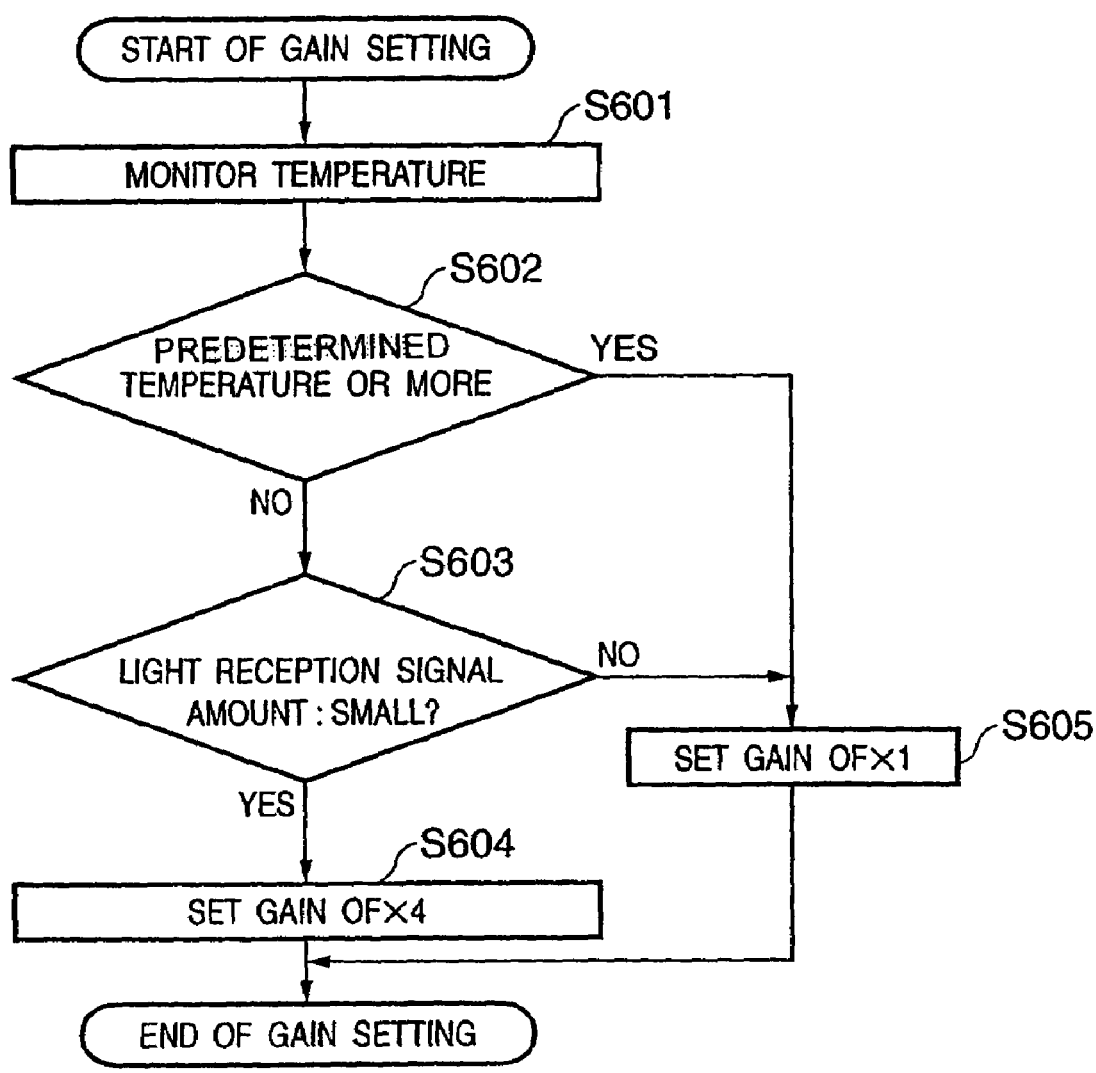
FIG. 6 is a flow chart for explaining a gain setting sequence in the distance measuring apparatus according to embodiments of the present invention.

FIG. 6 is a flow chart for explaining a gain setting sequence in the embodiment of the present invention. First of all, the temperature determination unit 23 measures the ambient temperature of a sensor (S601). The measured temperature is compared with the predetermined gain switching temperature (S602). When the ambient temperature is equal to or higher than the gain switching temperature, the gain of the output amplifier 19 is set to x1 (S605). When the ambient temperature is lower than the gain switching temperature, the CPU 21 compares a signal amount with a predetermined set value (S603). When the signal amount is smaller than the set value, the gain of the output amplifier 19 is set to x4 (S604). When the signal amount is larger than the set value, the gain of the output amplifier 19 is set to x1 (S605). Note that although the ambient temperature is determined with reference to the gain switching temperature in step S602 in this embodiment, it suffices that the gain is determined in consideration of the allowable dark current. The gain can be determined linearly or nonlinearly in correspondence with the output from the temperature determination unit 23.

Figure 7:
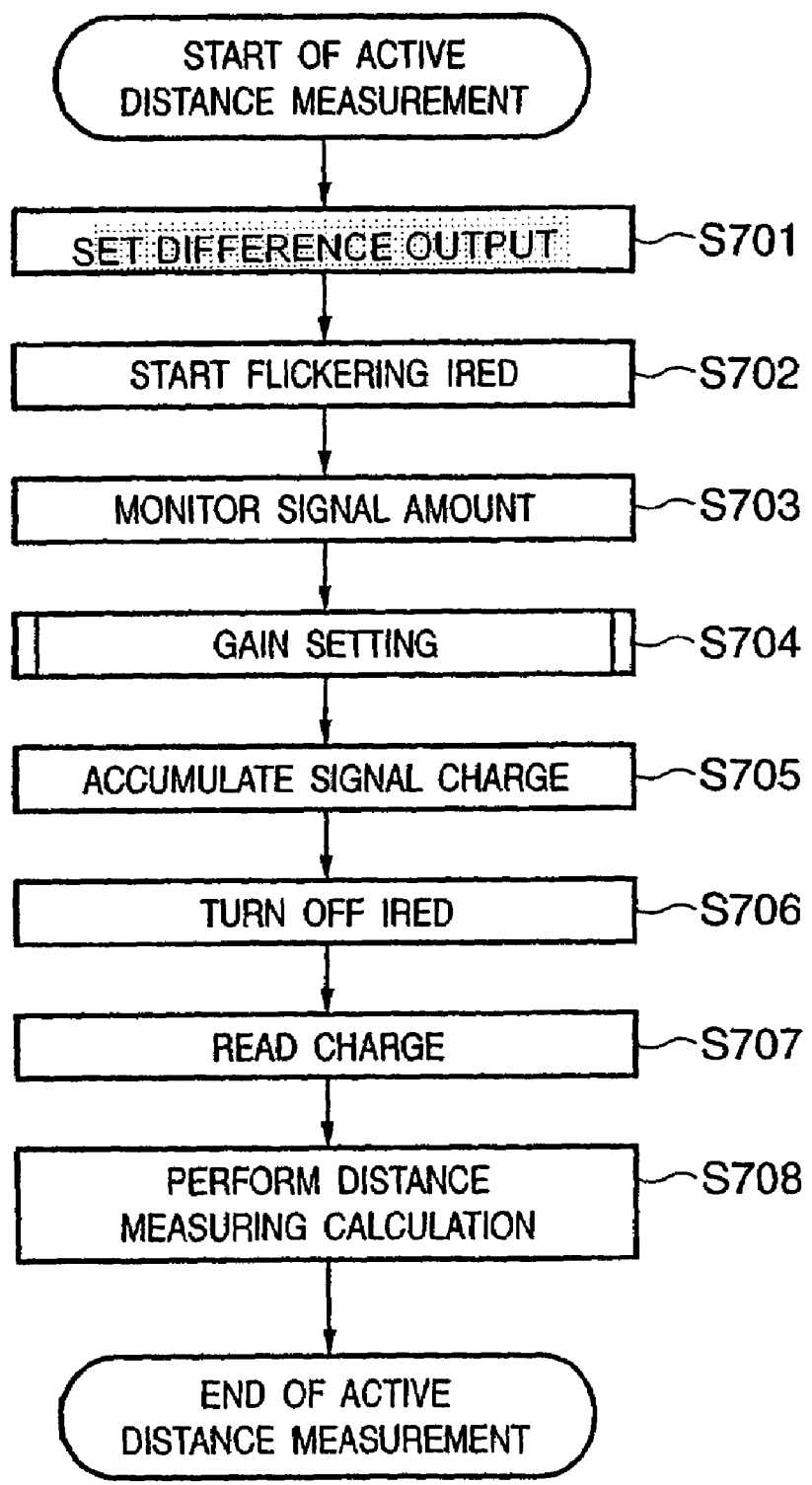
FIG. 7 is a flow chart for explaining active distance measuring operation in the distance measuring apparatus according to one embodiment of the present invention.

FIG. 7 is a flow chart for explaining active distance measuring operation in one embodiment of the present invention. When an active distance measurement instruction is output, the outputs from the difference calculation units 20 are set to output a difference signal (S701). Flickering of the IRED is then started (S702). Preaccumulation is performed to monitor light reception signal amount (S703), and the gain setting described with reference to FIG. 6 is done in accordance with the monitored light reception signal amount (S704). Signal charge accumulation is then started (S705). When the signal amount is integrated up to an amount necessary for distance measurement calculation or when a predetermined period of time has elapsed, the signal charge accumulation is stopped. The flickering of the IRED is stopped (S706), and the integrated signal charge is read (S707). The CPU 21 performs distance measurement calculation using the read signal (S708) to calculate the distance to the object. The CPU 21 alternately reads from the light-receiving units 15R and 15L the signals dependent on the light beams received by the light-receiving units 15R and 15L. In this embodiment, a signal transferred by one transfer unit is amplified by one of the amplifiers 19R and 19L, and a signal from the other transfer unit is not amplified or read during reading to the CPU 21. That is, while one signal is amplified and read, the other signal is repeatedly transferred in the ring CCD 48 of each of the light-receiving units 15R and 15L. In this case, the repeatedly transferred signal and the remaining signal have a difference in dark current amount when they are finally read to the CPU 21. In this embodiment, however, since the gain is set low in distance measurement at high temperatures, which generates a large amount of dark current, distance measuring instability caused by the difference in dark current amount can be suppressed.

Figure 8:
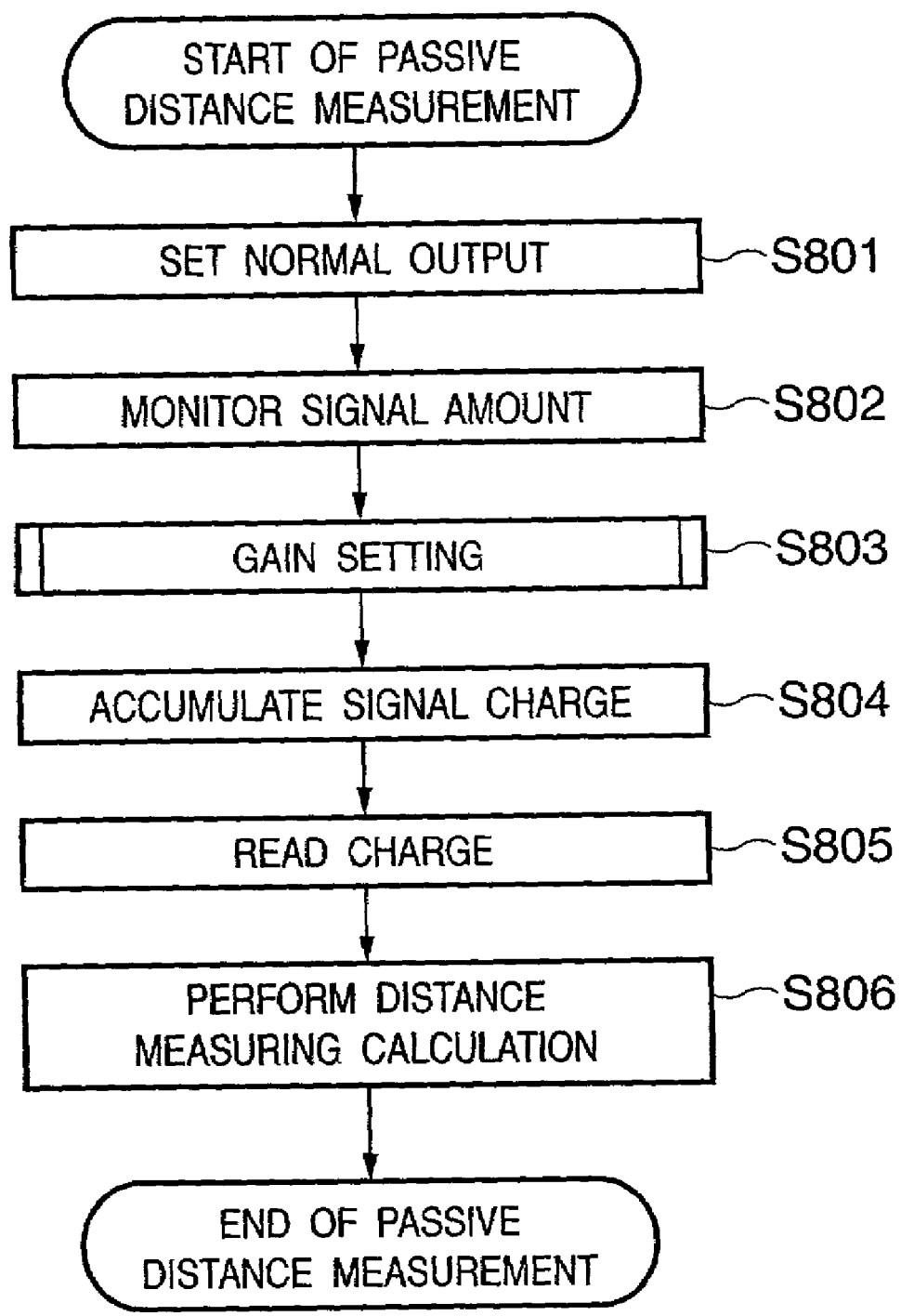
FIG. 8 is a flow chart for explaining passive distance measuring operation in the distance measuring apparatus according to one embodiment of the present invention.

FIG. 8 is a flow chart for explaining passive distance measuring operation in one embodiment of the present invention. When an active distance measurement instruction is output, the outputs from the difference calculation units 20 are set to always output (S801). Preaccumulation is performed to monitor light reception signal amount (S802), and the gain setting described with reference to FIG. 6 is done in accordance with the monitored light reception signal amount (S803). Signal charge accumulation is then started (S804). When the signal amount is integrated up to an amount necessary for distance measurement calculation or when a predetermined period of time has elapsed, signal charge accumulation is stopped, and the integrated signal charge is read (S805). The CPU 21 performs distance measurement calculation using the read signal (S806) to calculate the distance to the object.

Figure 9:
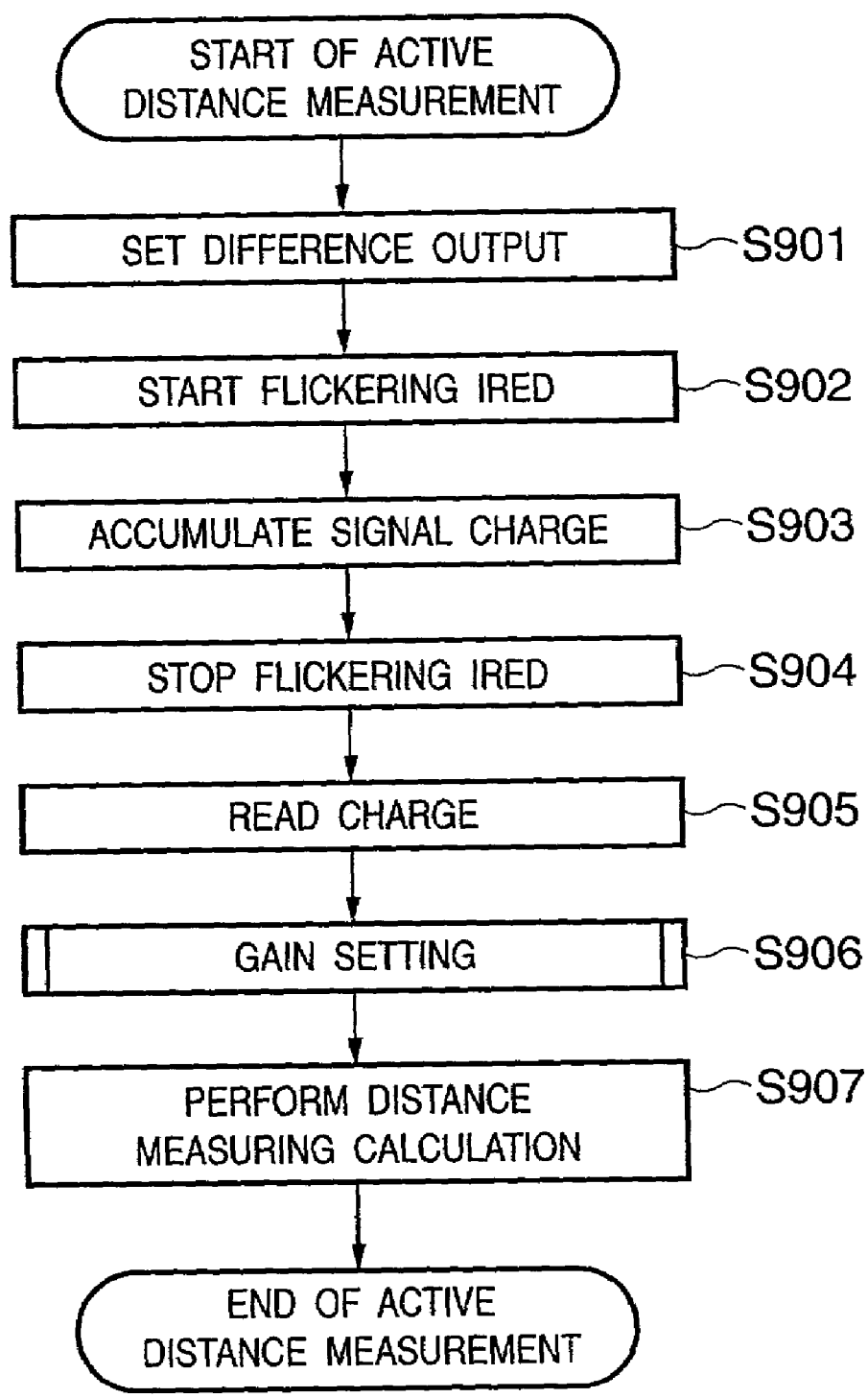
FIG. 9 is a flow chart for explaining active distance measuring operation in the distance measuring apparatus according to another embodiment of the present invention.

FIG. 9 is a flow chart for explaining active distance measuring operation in another embodiment of the present invention. When an active distance measurement instruction is output, the outputs from the difference calculation units 20 are set to output a difference signal (S901). Flickering of the IRED is then started (S902). Signal charge accumulation is then started (S903). When the signal amount is integrated up to an amount necessary for distance measurement calculation or when a predetermined period of time has elapsed, the signal charge accumulation is stopped. The flickering of the IRED is stopped (S904), and the integrated signal charge is read (S905). The CPU 21 then performs gain setting described with reference to FIG. 6 in accordance with the signal amount and ambient temperature (S906). The CPU 21 performs distance measurement calculation using the read signal (S907) to calculate a distance to the object.

Figure 10:
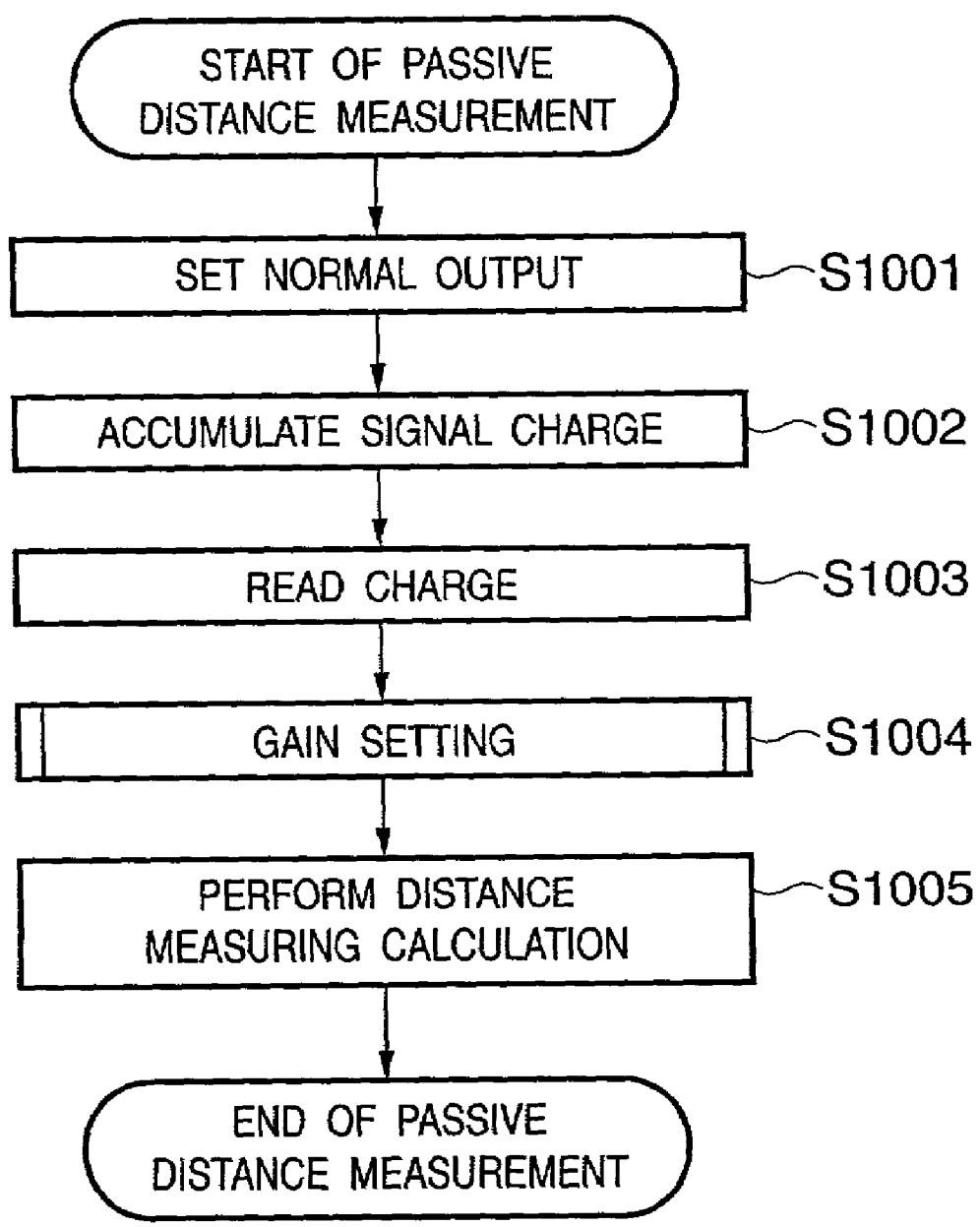
FIG. 10 is a flow chart for explaining passive distance measuring operation in the distance measuring apparatus according to another embodiment of the present invention.
Figure 11:
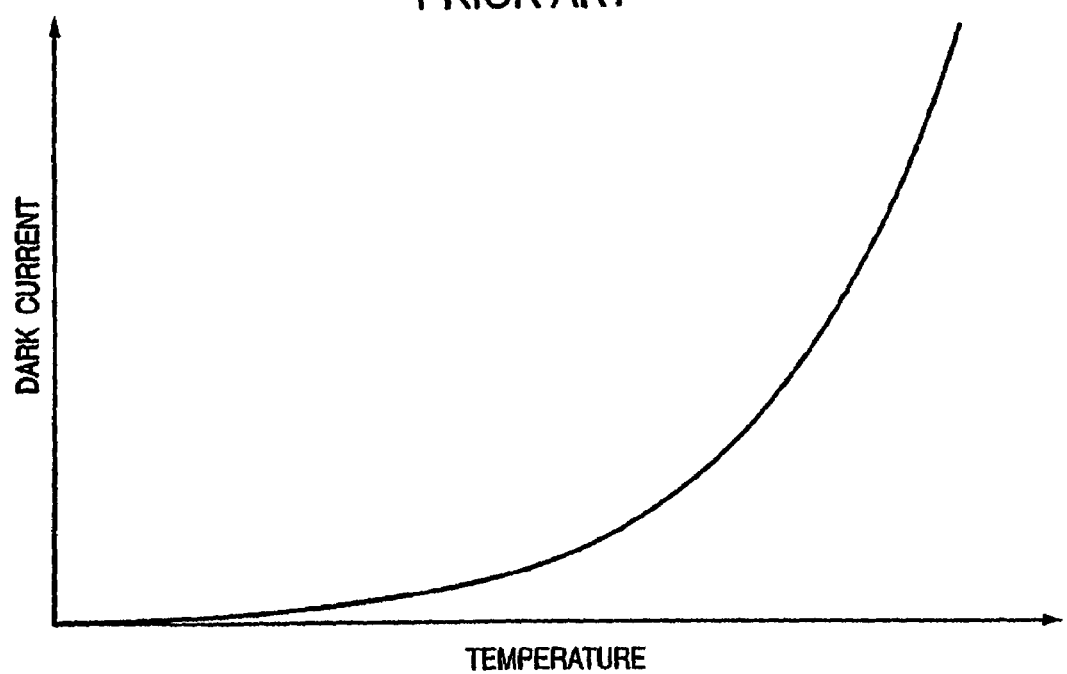
FIG. 11 is a schematic graph showing the relationship between the temperature and dark current in a CCD.

FIG. 10 is a flow chart for explaining passive distance measuring operation in another embodiment of the present invention. When an active distance measurement instruction is output, the outputs from the difference calculation units 20 are set to always output (S1001). Signal charge accumulation is then started (S1002). When the signal amount is integrated up to an amount necessary for distance measurement calculation or when a predetermined period of time has elapsed, the signal charge accumulation is stopped, and the integrated signal charge is read (S1003). The CPU 21 then performs gain setting described with reference to FIG. 6 in accordance with the signal amount and ambient temperature (S1004). The CPU 21 performs distance measurement calculation using the read signal (S1005) to calculate a distance to the object.

According to the embodiments which perform the above operations, a high gain (gain of x4 in the embodiments) which cannot be used due to a large dark current at high temperatures in the conventional case can be selected at temperatures when the dark current amount does not exceed the allowable value. Distance measurement with a low signal level, which cannot be done in the conventional case, can be done at a predetermined temperature or less. A distance measuring apparatus which can improve the total distance measuring capability can be implemented.

The present invention has been described with reference to the embodiments. The present invention, however, is not limited to them. Various changes and modifications may be made. In this embodiment, for example, a single hybrid distance measuring apparatus is used to perform both the active and passive distance measuring schemes. However, the present invention is also applicable to a distance measuring apparatus which performs only one of active and passive distance measurements. More specifically, the present invention is applicable to an active distance measuring apparatus having one light-receiving unit to calculate distance by triangulation using the barycentric position of a light reception image. Alternatively, the present invention is also applicable to a passive distance measuring apparatus having one charge accumulation unit in place of the two charge accumulation units of the above embodiments to perform passive distance measurement, or a distance measuring apparatus having one charge accumulation unit to transfer signal charges in the light projection means ON and OFF states to the ring portions at different timings in active distance measurement.

Only two gains can be selected in the above embodiments. However, three or more gains can be selected, or switching temperatures respectively corresponding to gain values may be set. Similarly, the gain may be calculated in accordance with the measured temperature to obtain the same effect as described above.

In the above embodiments, two light-receiving units and two skim operation portions are arranged. However, three or more light-receiving units and three or more skim operation units may be used to obtain the same effect as described above.

The gain is switched using the amplifier of the output stage of the sensor in the above embodiments. The sensor output may be directly output, and the gain of the input signal may be switched in the CPU.

The arrangement adapted to control the gain in accordance with the temperature in the above embodiments need not be limited to the distance measuring apparatus, but can be applied to an image sensing apparatus having an arrangement including a light-receiving unit in which photodiodes are arranged in a form of matrix and an image processing unit for converting a signal from the light-receiving unit into a digital signal and performing processing such as white balance processing and color processing in order to form an image. The above gain control is performed to eliminate drawbacks in which the signal level from the light-receiving unit increases due to an increase in dark current and the signal level exceeds the allowable signal level of an A/D converter.

The above embodiments employ a CCD serving as a charge transfer unit adapted to transfer charges generated by the light-receiving unit. However, a MOS solid-state image sensing element for converting the charge into a voltage or current and transferring the charge in accordance with the voltage or current state may be used.

As described above, according to the above embodiments, in a distance measuring apparatus having a mechanism adapted to transfer a charge upon photoelectrically converting a light reception signal by using a charge transfer means such as a CCD and for switching the gain of the output signal from the light-receiving sensor or the input amplifier gain of the microcomputer in accordance with the light reception signal amount, each gain is switched in accordance with the ambient temperature of the distance measuring apparatus, and more specifically a high gain is inhibited at high temperatures. There is implemented a distance measuring apparatus capable of setting a high gain even under a condition that a signal amount is small at low temperatures and improving the distance measuring capability.

Part of the charge transfer unit is formed in a ring shape and the signal charges are integrated while being circulated in the ring portion as in the above distance measuring apparatus. In this case, a dark current generated in the ring portion and a linear portion for connecting the pixel and ring portion is gradually integrated in the ring portion together with the signal charge. For example, in monitoring the integrated charges in the ring portion, the interruption of accumulation upon detecting the dark current charge although the signal charge is not integrated in a necessary amount can be effectively prevented.

OTHER EMBODIMENT

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As described above, the embodiments of the present invention have effects of reducing the influence of dark currents in an image sensing apparatus, a distance measuring apparatus, an image sensing method, and a distance measuring method.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   a signal generator adapted to generate a signal upon reception of input light;
   a transfer unit adapted to transfer the signal generated by said signal generator;
   a temperature measuring unit adapted to measure a temperature;
   a signal measuring unit adapted to measure a signal amount;
   an amplification unit adapted to amplify the signal transferred from said transfer unit; and
   a control unit adapted to control to decrease a gain when a temperature measured by said temperature measuring unit is higher than a predetermined temperature, increase the gain when the temperature measured by said temperature measuring unit is lower than the predetermined temperature and the signal amount measured by said signal measuring unit is lower than a predetermined signal amount, and decrease the gain when the temperature measured by said temperature measuring unit is lower than the predetermined temperature and the signal amount measured by said signal measuring unit is higher than the predetermined signal amount,
   wherein said predetermined temperature is set such that dark current of said amplification unit does not exceed a predetermined value.

2. The apparatus according to claim 1, wherein the apparatus further comprises a calculation unit adapted to calculate a correlation between at least two signals amplified by said amplification unit.

3. The apparatus according to claim 2, wherein said signal generator comprises a plurality of light-receiving units adapted to receive object images and generates said at least two signals.

4. The apparatus according to claim 1, wherein said transfer unit comprises at least two transfer units, and while said amplification unit amplifies a signal transferred from one transfer unit, said amplification unit does not amplify a signal transferred from the other transfer unit.

5. The apparatus according to claim 1, wherein the apparatus further comprises a light projection unit adapted to project light to an object, and said signal generator receives light reflected by the object and generates a signal upon ON/OFF operation of said light projection unit.

6. The apparatus according to claim 1, further comprising a skim unit adapted to remove a predetermined amount of charge from a charge transferred from said transfer unit.

7. The apparatus according to claim 1, wherein said transfer unit comprises a charge transfer unit at least part of which is coupled in a ring shape.

* * * * *